United States Patent
Kerry et al.

(10) Patent No.: US 7,599,597 B2
(45) Date of Patent: Oct. 6, 2009

(54) NETWORK TERMINATION APPARATUS

(75) Inventors: John Kerry, Ipswich (GB); Philip A Barker, Ipswich (GB); Philip J Longhurst, Ipswich (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 10/594,678

(22) PCT Filed: Apr. 1, 2005

(86) PCT No.: PCT/GB2005/001265

§ 371 (c)(1),
(2), (4) Date: Sep. 28, 2006

(87) PCT Pub. No.: WO2005/096054

PCT Pub. Date: Oct. 13, 2005

(65) Prior Publication Data

US 2007/0206780 A1     Sep. 6, 2007

(30) Foreign Application Priority Data

Apr. 1, 2004  (GB) ................................. 0407482.9
Mar. 31, 2005 (GB) ................................. 0506601.4

(51) Int. Cl.
*G02B 6/00* (2006.01)
(52) U.S. Cl. ...................................... 385/135; 385/134
(58) Field of Classification Search ................. 385/135
See application file for complete search history.

(56) References Cited

U.S. PATENT DOCUMENTS

| 5,274,731 | A | * | 12/1993 | White | 385/135 |
| 5,303,320 | A | * | 4/1994 | Duffie | 385/135 |
| 5,434,944 | A | * | 7/1995 | Kerry et al. | 385/135 |
| 5,647,045 | A | * | 7/1997 | Robinson et al. | 385/135 |
| 5,721,394 | A | | 2/1998 | Mulks | |
| 6,201,920 | B1 | | 3/2001 | Noble et al. | |
| 6,249,671 | B1 | * | 6/2001 | Tucker et al. | 455/90.3 |
| 6,496,641 | B1 | * | 12/2002 | Mahony | 385/135 |
| 6,721,484 | B1 | * | 4/2004 | Blankenship et al. | 385/135 |
| 6,980,725 | B1 | * | 12/2005 | Swieconek | 385/135 |
| 2002/0031942 | A1 | * | 3/2002 | Magyar et al. | 439/535 |
| 2003/0184446 | A1 | * | 10/2003 | Romano et al. | 340/693.2 |
| 2004/0268160 | A1 | * | 12/2004 | Atkinson et al. | 713/300 |
| 2005/0094959 | A1 | * | 5/2005 | Sibley et al. | 385/135 |
| 2006/0098931 | A1 | * | 5/2006 | Sibley et al. | 385/135 |
| 2006/0153516 | A1 | * | 7/2006 | Napiorkowski et al. | 385/135 |

FOREIGN PATENT DOCUMENTS

| EP | 0305723 A3 | 7/1988 |
| EP | 1316829 A3 | 6/2003 |
| JP | 9-101433 | 4/1997 |
| WO | WO 96/07227 | 3/1996 |
| WO | WO 03/046622 A1 | 6/2003 |

* cited by examiner

OTHER PUBLICATIONS

International Search Report dated May 25, 2005.

*Primary Examiner*—Frank G Font
*Assistant Examiner*—Eric Wong
(74) *Attorney, Agent, or Firm*—Nixon & Vanderhye PC

(57) ABSTRACT

An installation for terminates a network cable of a public communication network at customer premises. The network cable is terminted and a connector allows a connection to be made between the public communication network and the customer premises via the termination. The termination is enclosed within an external wall of the customer premises. A first closeable access aperture is provided to permit access to the termination from outside the customer premises, and a second closeable access aperture is provided to permit access to the termination from within the customer premises.

10 Claims, 15 Drawing Sheets

NETWORK TERMINATION APPARATUS

This application is the U.S. national phase of international application PCT/GB2005/001265 filed 1 Apr. 2005 which designated the U.S. and claims benefit of GB 0407482.9 and GB 0506601.4, dated 1 Apr. 2004 and 31 Mar. 2005, respectively, the entire content of which is hereby incorporated by reference.

BACKGROUND

1. Related Art

The present invention relates to a method and apparatus for the termination of a cable of the external telecommunications network at customer premises, with particular reference to termination of optical fibres in the context of bringing fibre to the home (FTTH).

Public switched telecommunication networks currently comprise an access network of cables routed through various exchanges, which ultimately terminate on the distribution side in premises of commercial, industrial, or consumer customers. These cables are typically terminated on network termination points (NTEs) located at the customer's premises. Historically these cables have been twisted copper pairs, but increasingly there is a migration to FTTH to provide customers greater bandwidth for communications purposes.

Most of the customers connected to the access network by optical fibre are commercial entities. The significant cost of obtaining optical connection has, up to recent times, discouraged private or residential takeup. Moreover, the obtrusiveness of current optical network termination (ONT) equipment required to support the fibre connection—usually unimportant in an industrial or commercial environment, where it is usually hidden away in a dedicated communications room—would not sit well in a residential context. As prices start falling however, demand for FTTH is growing.

Currently, in a copper-based system, it is the practice to connect residential customer premises for telecommunications only after construction of the premises. The process typically involves the following steps: a cable from the access network terminating near to a customer's premises is led from a primary cross connection point located in a street cabinet, either by overhead or underground feed, to the wall of the premises. A hole is drilled through the fabric of the wall to allow the arriving cable access to pass into the premises. The cable passes into the interior of the premises, and is terminated at an NTE (such as, in the UK, an NTE5 master linebox). As its name suggests, the NTE typically marks the legal extent of the authority and responsibility of the external network service provider (such as British Telecommunications plc in the UK). Such termination boxes cover the raw access hole on the interior wall, are either surface- or flush-mounted, and include a socket on the faceplate for compatible connector plugs such as a BT431 connector for telephones.

The surface-mount boxes tend to abut about 36 mm from the wall and are generally bulky and aesthetically displeasing. They are also susceptible to accidental or malicious damage as they can be knocked against and dislodged. The flush-mounted boxes need to be used with a compatible back box. However these are more time-consuming to install than surface-mounted boxes, as the wall surface will need to be broken to create a suitable cavity to accept the back box.

The present methods of installing a copper wire termination point therefore suffer from the need to destroy the building fabric of the premises by creating access for the entering external cable. NTEs are either unattractively bulky and thus unsuitable particularly in residential settings, or else are installed by further modification to the building infrastructure and at considerable cost, expertise and inconvenience.

Accessibility problems arise from the current method of locating NTEs on the interior walls of premises. The external network service provider needs to arrange appointments with the customer to gain access to the premises to install the connection, or to carry out other work related to the termination point, such as maintenance work, testing, or the making of replacements. This is a significant problem, caused by the busy and conflicting schedules of the external service provider and the householder. Service providers will seek to carry out their work mainly during office hours, the time during which working customers will not be at home. If schedules fail to match—which may occur in spite of appointments made for specific timeslots due to factors outside the parties' control—much time is lost and the financial cost of re-scheduling and re-making the visit is considerable. Valuable commercial goodwill is also lost in the process, which is of particular significance in an open telecommunications market.

One solution is to provide NTEs on the exterior of the premises. This is a common practice in the United States. While this solution does allow the external network service provider ready access to the NTE and the termination point, this location of equipment is vulnerable to damage—environmental, accidental and malicious. The NTE housing has to be made very strong to protect its contents—this has an impact on its cost and its size. Moreover, the relocation of the housing for the equipment from the inside of the premises to the outside may not necessarily improve the aesthetics of the premises—which is especially relevant in the case of residential properties. As described more fully below, the increased fragility, cost and size of an optical network termination (ONT) may make it unsuitable for such a vulnerable location outside of the premises.

There is yet another issue concerning accessibility to the network termination point. In the UK and many other countries, the days when a single service provider would supply a customer everything, from access to the network to the telephone in the sitting room, are gone. Customers are now free to tailor their own internal communications needs. The problems experienced by service providers has been discussed; customers should not experience the same problems with access to externally-located NTE, but other issues may arise, such as safety concerns, e.g. the risk of customers looking directly at a plug end and the associated laser hazard, which might arise if they have access to the fibre equipment arriving from the access network.

The above issues relate in the main to copper-based systems, but are not exclusive to them. The problems are further compounded with the advent of FTTH. This is due to the delicate nature of the ONT equipment, as well the sensitivity of optical fibre joins to misalignment, dust and the like. (In this description, references to "fibre unit" shall include individual fibre members as well as fibre bundles comprising a number of fibre members.)

Unlike copper wires, optical fibre has an inherent minimum bend radius which cannot be exceeded without risk of physically damaging the fibre unit or adversely affecting the performance of the fibre. A bare optical fibre comprising just the core, cladding and primary buffer has a minimum permissible bend radius typically of about 60 mm. A fibre cable including its outer protective layers, and bundles of optical fibre have even greater minimum permissible bend radii. Housing for fibre need to be dimensioned accordingly to accommodate the bend.

Furthermore, there is likely to be more equipment supporting the optical connection to the premises—such as a power supply for the equipment, Ethernet cables, co-axial cables, and the like—than is necessary with copper connections. All this means that the overall size of the housing for equipment for FTTH will be even bulkier—and even more of an eyesore and prone to damage—than today's copper-based NTEs already are, whether located within or external to the premises.

A further issue arising in the UK is the drive by Ofcom (the regulator and competition authority for communications industries in the UK) for open access to networks, to lead to greater competition between service providers. The applicants anticipate that in this climate, the network termination point will need to be precisely defined to clearly demarcate the limit of the access network service provider's extent of responsibility. The communications market is moving away from the days when the access network service provider supplied everything up to and including the telephone.

Present methods to terminate optical networks have ONTs located in the same positions as those used for copper-based NTEs, namely on the interior wall of the premises, or externally to the premises. The problems experienced by NTEs are exacerbated by the increased size of the housing required by the ONT equipment, the fragility of the optical fibre and any splices or connections providing the connection.

For all the above reasons, it would be desirable to have a solution to address the problems associated with locating the termination point for the access network on the inside of premises, or externally of the premises.

BRIEF SUMMARY

According to a first aspect of the invention, there is provided an installation for terminating a network cable of a public communication network at customer premises, the installation comprising termination means for terminating the network cable, and connection means allowing a connection to be made between the public communication network and the customer premises via the termination means, the termination means being enclosed within an external wall of the customer premises, the apparatus further including a first closeable access aperture to permit access to the termination means from outside the customer premises, and a second closeable access aperture to permit access to the termination means from within the customer premises.

The method and apparatus of the present invention provides an improvement and/or alternative to current methods and apparatus for the termination of external network cables—comprising copper or optical fibre—on customer's premises which seek to mitigate or avoid at least some of the aforementioned drawbacks.

BRIEF DESCRIPTION OF THE DRAWINGS

Systems, methods and apparatus embodying the present invention will now be described by way of example only, with reference to the following drawings, wherein.

DETAILED DESCRIPTION OF EXEMPLARY EMBODIMENTS

Figure 1:
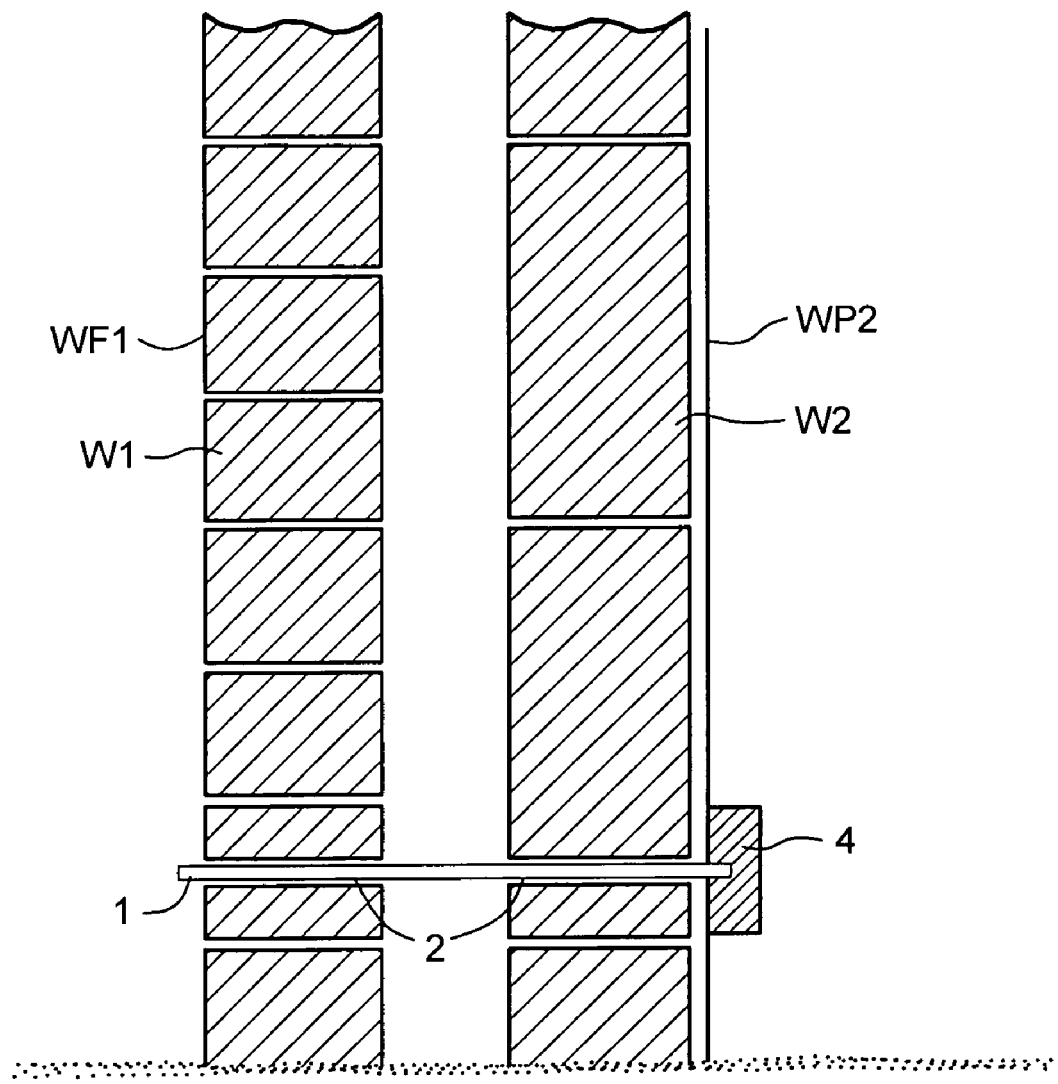
FIG. 1 is a view of a cross section of the walls of a customer's premises, depicting the prior art method of providing telecommunications connections using the termination point of FIG. 2.

As outlined above, the current method of providing telecommunications connections—whether copper- or fibre-based—to customer's premises is to retrofit them to buildings. This is done by leading a cable or an optical fibre tube from the access network to the premises, either from above e.g. on telephone poles (in an overhead configuration), or through cable ducts buried in the ground (in an underground configuration). An access hole is then created by drilling through the wall—or walls, in the case of a cavity wall installation—of the premises. In the UK, cavity walls are commonly used to separate the interior of the premises from the exterior. These typically comprise two sections or skins, between which insulation can be installed. In the cavity wall installation depicted in FIG. 1, W1 and V2 are the exterior and interior walls respectively. Exterior wall W1 has an outward face WF1 and interior wall W2 has an inward face WF2. The cable (1) leading from the external network passes through access hole(s) (2) created for this purpose. The cable (1) is then terminated at the network termination point, such as a termination box (4) like a NTE5. The termination box is located at, in or on the interior wall (W2) of the premises. This can be mounted on the surface of the interior wall as depicted in the figure, or it could be flush-mounted so that the extent of protrusion of the box from the wall is somewhat diminished.

Figure 2A:
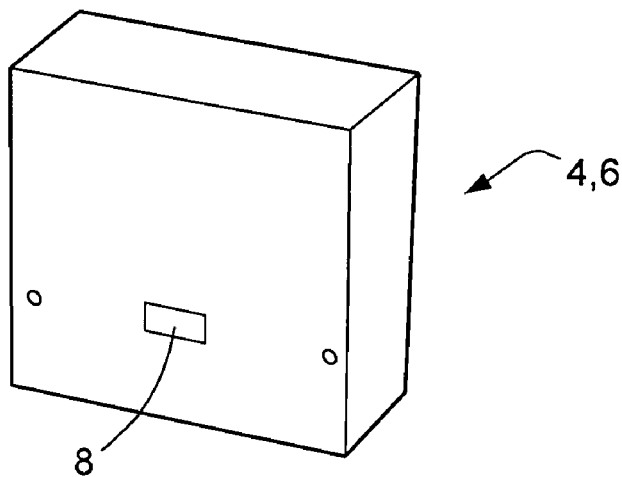
FIGS. 2A and 2B shows a prior art network termination point, the NTE5 linebox.
Figure 2B:
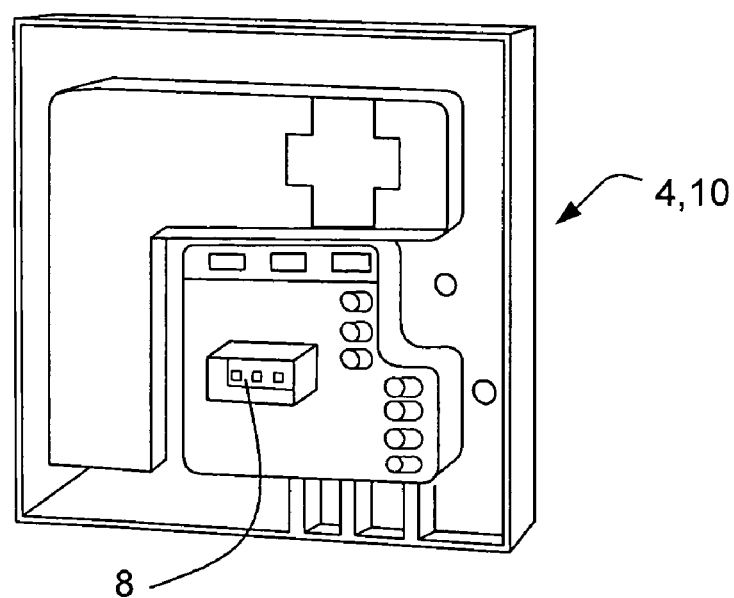

FIG. 2 shows the front and back views of a commonly-used NTE (4), the NTE5. On the front panel (6), access in the form of a socket (8) is provided for a compatible connector plug such as the BT431 connector. On the back (10), the cable can arrive through one of the holes in the back box (which is surface or flush-mounted) and is terminated at the screw terminals.

As indicated above, the present method of providing telecommunications connection to customer premises by retrofitting is costly, wasteful and inconvenient. The resulting NTE protruding from the customer's interior wall is unattractive; the installation of a flush-mounted NTE requires further destruction to the interior wall and involves considerable cost, time and expertise. As the NTE is located on the interior wall (W2) of the customer's premises, the party responsible for the external network must co-ordinate with the party authorized to allow access to the interior of the premises; the failure of either party to keep appointments results in much wasted time and money, and lost goodwill.

Furthermore, the current NTE apparatus and installation methods address only the deployment of copper wire pairs, so that when the time comes to upgrade the premises to an optical connection, the premises will have to undergo further costly and time-consuming work and damage. This is because the properties of optical fibre are substantially different from copper wire: for example optical fibre is highly bend sensitive. Bending about too tight a radius results in increased optical loss and can lead to fibre damage or even fracture. However, copper wire is not bend sensitive and copper wire pairs are routinely installed under conditions which would severely damage optical fibre.

First Embodiment: Single Chamber

Figure 3:
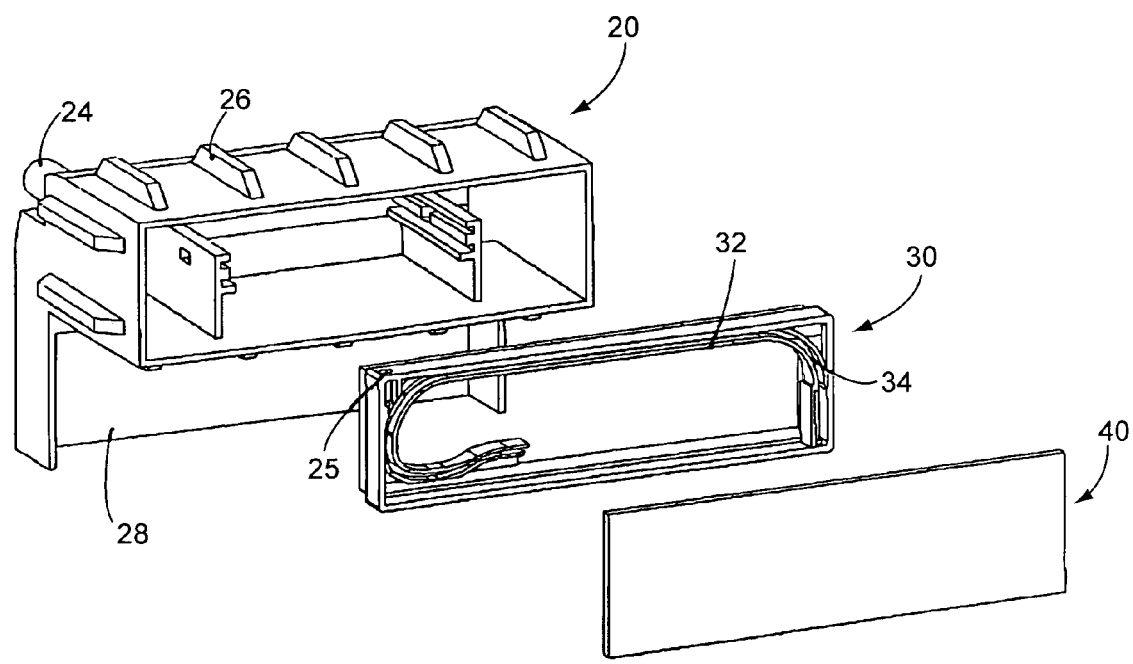
FIG. 3 is an exploded view showing the components making up a device of a single-chambered embodiment of the invention.

FIG. 3 shows a first embodiment of the invention, being a single-chambered device, in an exploded form with its component parts. The device (5) comprises a housing (20), a fibre management adapter (30) and a front cover (40). This embodiment with the fibre management adapter would be used for installations fed externally by distribution cables arriving on the outward face (WF1) of the external wall (as opposed to a cavity feed, see below e.g. FIGS. 8 and 9).

When installed, the device forms part of the building fabric, as a "brick replacement". It is proportioned so that it can be installed into the wall, and so that once installed, the device preferably does not substantially project from the outward face (WF1) or inward face (WF2) of the wall.

Preferably, the device is installed while the building is being constructed. If the wall is made of house brick, the device could be installed by laying it in mortar as if it too, were a house brick. Doing so would realise a significant advantage of the invention, as installation during construction will obviate the cost and effort in later destroying the building fabric by retrofitting. It is however, within the scope of the invention to have the device installed by retrofitting, to realise the other advantages afforded by the adoption of the invention.

The housing or receptacle (20) is the component that would be provided to the building trade for incorporation into the wall as the premises are built, according to the preferred mode of installation described above. The unit is made of a material, such as steel or an engineering grade plastics material, sufficiently strong to serve as a "brick replacement" when installed. The material should preferably be insensitive to, or adequately protected from, the strong alkali which is present in most building mortars. In addition, if a plastics material is used it should not lose its desirable mechanical properties under the influence of the ultraviolet radiation present in sunlight, which may mean either that an insensitive material is used or it is given suitable and durable protection from the ultraviolet radiation. Also, to improve the bonding of mortar to the housing, the surfaces of the brick which are to be mortar bonded are preferably finished with a mortar-adherent coating. This could, for example, be aggregate (e.g. sand or grit) glued or otherwise secured to the surface of the housing.

In the embodiment shown in FIG. 3, the housing (20) includes a void substantially similar in volume to that of the relevant component making up the wall e g. a brick. The device includes receiving arms (22) to accept e.g. a splice tray (23) (discussed below in connection with FIG. 6). Any other components for the termination, connection, etc. of the cable can be housed within the void as well. In particular, the device can be used for various cable types (twisted copper pairs, coaxial, optical fibre etc.), so use of the invention is flexible and capable of upgrades from e.g. copper pairs to optical fibre as it can cope with the properties of both equally well. The invention thus helps to future-proof customer premises in this aspect.

In the UK, standard building bricks are typically 215 mm long, 102.5 mm wide and either 50 or 65 mm high, for use with 10 mm mortar joints. Other sizes are sometimes used in the UK and the standard sizes in other countries are likely to differ from those of the UK. Obviously, the precise dimensions of the housings according to the invention can be set for the local standard brick sizes. Similarly, if the local building "block" is a stone or cement block of some other typical size, that size can be used as the basis for dimensioning the housing. However, housings with dimensions of around 175 mm to 250 mm length, by 75 mm to 150 mm wide and 50 mm to 150 mm high are likely to be useful and practical, while not being so large as to give rise to structural issues with wall building. In general, excessively large housings are to be avoided.

In order to encourage and facilitate the adoption of the invention by the building trade it is sensible to ensure that the housing of the invention can be laid just like any other brick or building block without the bricklayer having to adopt his or her working practices. This suggests that the housing should not be appreciably longer, wider or thicker than a standard brick, nor should it be much thinner. Of course, one might find a use for a "double length" or "double height" housings (but whose dimensions actually take account of the loss of one mortar joint). Easier to use in many cases would be a housing of half length, since many brick laying patterns (bonds) make use of half bricks. However, it may not always be possible to fit in to such a half brick all the components and fibre desired. Moreover, bend management of fibre may be a problem (depending upon the fibre type) with such a half brick. The housing could also be somewhat narrower than a conventional brick, but there is little if any advantage in that and indeed the full width would also be useful for housing splices and electronics.

Prior art NTE boxes such as the NTE5 serve mainly a single purpose—to terminate the cable from the external network and to provide a socket for receiving a connector plug such as an RJ11. Because of the position in which it is installed, designers of such boxes seek to keep its size to a minimum to reduce its protrusion from the wall (in a surface mounting) or to ease its installation (in a flush mounting).

As against this, the device of the present invention in a preferred embodiment includes a relatively large void, i.e. substantially similar to the volume of the relevant building component, e.g. a house brick. In the preferred embodiment there will be room in the void not only for apparatus for the traditional NTE functions of cable termination and connection, but also for other functionalities such as fibre storage, passive optical devices, DSL filters and the like. By having the capacity to include other functionality in this manner, use of a device of the invention will reduce the amount of telecommunications plant visible to a householder within the premises. It may also go some way in guarding against premature obsolescence of the installation, as newly developed devices and apparatus for methods and technologies perhaps yet to be developed, could be sited within the device of the invention.

The distribution cable/fibre tube from the external network could enter the housing (20) from the external cable duct in a number of ways, e.g.

By underground feed through duct terminating at ground level against the outer face (WF1) of the exterior wall, then upwards over the wall to the device and entering via the front of the fibre management adapter (30)

By overhead feed through duct terminating against the outer face (WF1) of the exterior wall, then downwards over the wall to the device and entering via the front of the fibre management adapter (30)

In an installation with cavity walls, by underground feed and then upwards through the cavity towards the rear of the device in a cavity feed In this description, references to "cable" will in the appropriate case, include blown fibre tube where the customer premises are intended to be initially installed with tube prior to installing optical fibre by blowing.

Cavity feeds are most likely to be used in "new-build" situations. An advantage of supplying cable to premises in this manner is that the cable is protected from the elements upon duct exit. In a cavity feed, the cable of the external network is fed into the housing via a duct entry (25).

Preferably, a number of knockout holes are provided within the housing to allow selection of where the duct entry is positioned. This would allow the housing to sit in an optimal position to prevent or minimise any strain caused by the duct position. In an overhead or underground feed duct which terminates at ground level against the exterior wall, the duct entry would be positioned to keep the incoming cable as vertical as possible.

The figure shows flanges (26) and a back plate (28) that can be provided on the exterior of the housing to facilitate correct alignment and positioning of the housing as it is being installed, and to support and anchor it thereafter.

The embodiment shown in FIG. 3 includes an optional fibre management adapter (30). This is used in an optical fibre setup, and where the optical tubes or fibres arrive via the exterior wall (as opposed to a cavity feed). A path (32) is provided to receive the optical tube or fibre, which is configured to guide the tube or fibre around corners (e.g. 34). This controls fibre bend and can help prevent excessive bending and the consequent drop in fibre performance. Preferably, knockout holes (e.g. 25) are provided in the fibre management adapter to accept tube or cable from a variety of entry positions.

The device shown in FIG. 3 includes a front cover (40). The device of the invention is configured to be installed so that the housing can be accessed from the exterior of the premises. The cover protects the contents of the housing (20), which would otherwise be exposed to the elements. A weatherproof seal is preferably provided to seal the joint between the cover and the main body of the housing to prevent, for example, ingress of water. Some form of locking mechanism may also be provided, although it is likely that as installed no lock will be provided: a lock being installed later when a circuit is provisioned.

In a preferred embodiment, the colour, texture etc. of the exterior appearance of front cover is made to resemble the other components making up the exterior wall (common house bricks, breeze blocks, stone or cement blocks or the like). The presence of the device when installed will then affect appearance of the outward face (WF1) of the exterior wall only minimally.

Figure 4:
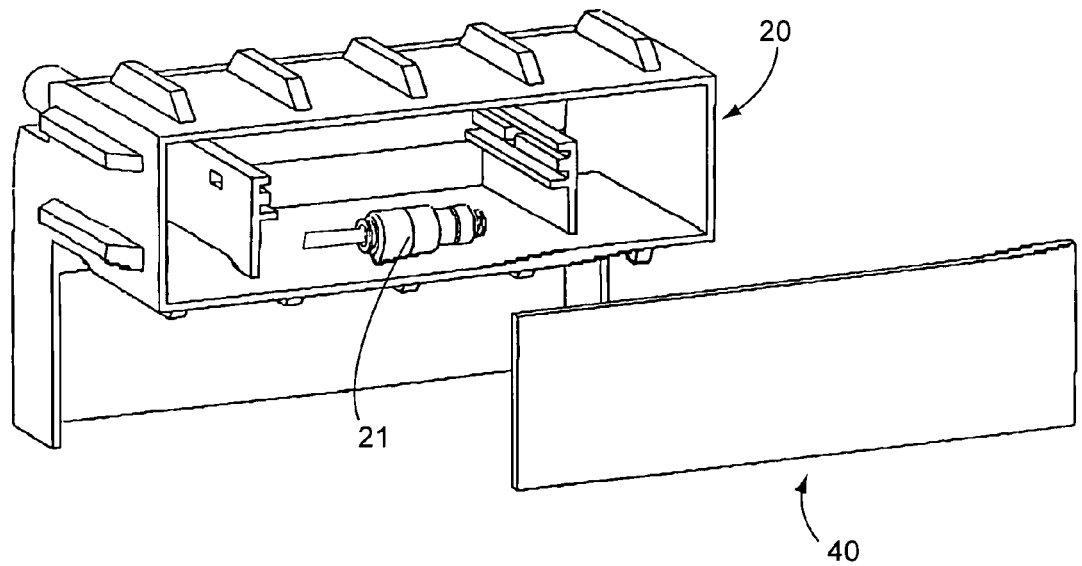
FIG. 4 is view of the single-chambered device of FIG. 3 and its components when installed in a cavity wall with the duct entering from the cavity below.

FIG. 4 is an exploded view of the component parts of the device when used in a cavity wall setup, where the cable duct enters the housing (20) from an underground feed. A gas block connector (21) (which serves to block the travel of any gas present in the system beyond this point when using blown fibre tubes) is included within the cavity of the housing. Alternatively, the invention could have the gas vented to the exterior of the premises, and seal off the path leading into the interior of the premises.

Figure 5A:
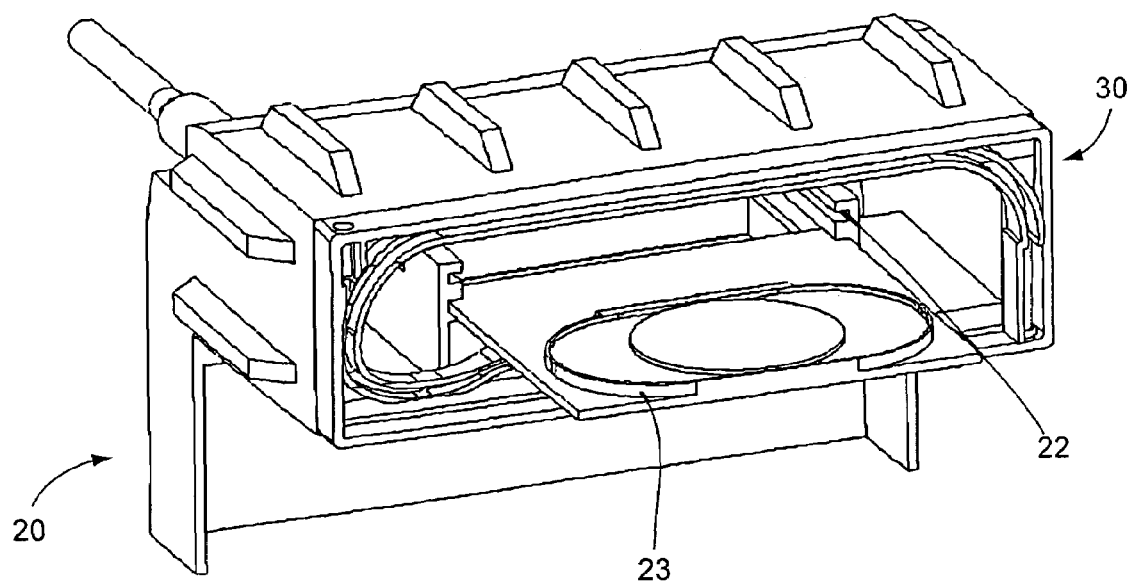
FIG. 5A is a view of the single-chambered device including a fibre storage tray and a fibre management adapter.
Figure 5B:
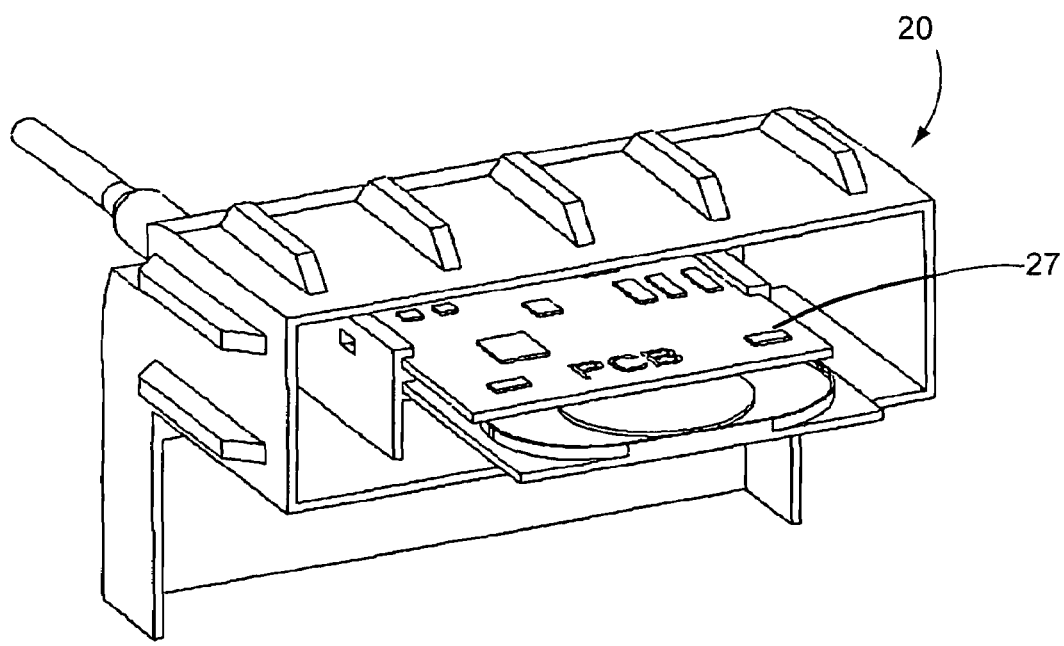
FIG. 5B is a view of the single-chambered device including a tray for a printed circuit board or other electronics module.

FIG. 5A depicts a housing (20) with the fibre management adapter (30) fitted thereto. Slotted into the receiving arms (22) is another optional item, a components tray (23). The tray is slidably mounted on receiving arms (22) and installed by pushing it to the back of the housing along the arms. In the figure, the tray has been pulled away from its closed position to better illustrate it. The tray can of course be installed within the housing in other ways—for example on a pivot along a horizontal or vertical axis as well as being slidably mounted or a combination of such mounting techniques. In the present embodiment, the tray is a fibre storage tray to receive optical tube or fibre entering the device, with its own path to control and guide the optical fibre or tube bend. The tray could equally comprise or house passive optical devices or other components. There is in this embodiment, space above the components tray to further accommodate sealed electronics modules, such as an NTE, DSL filters, printed circuit boards or other components (27) in the form of subsequent trays or otherwise, as shown in FIG. 5B.

Figure 6:
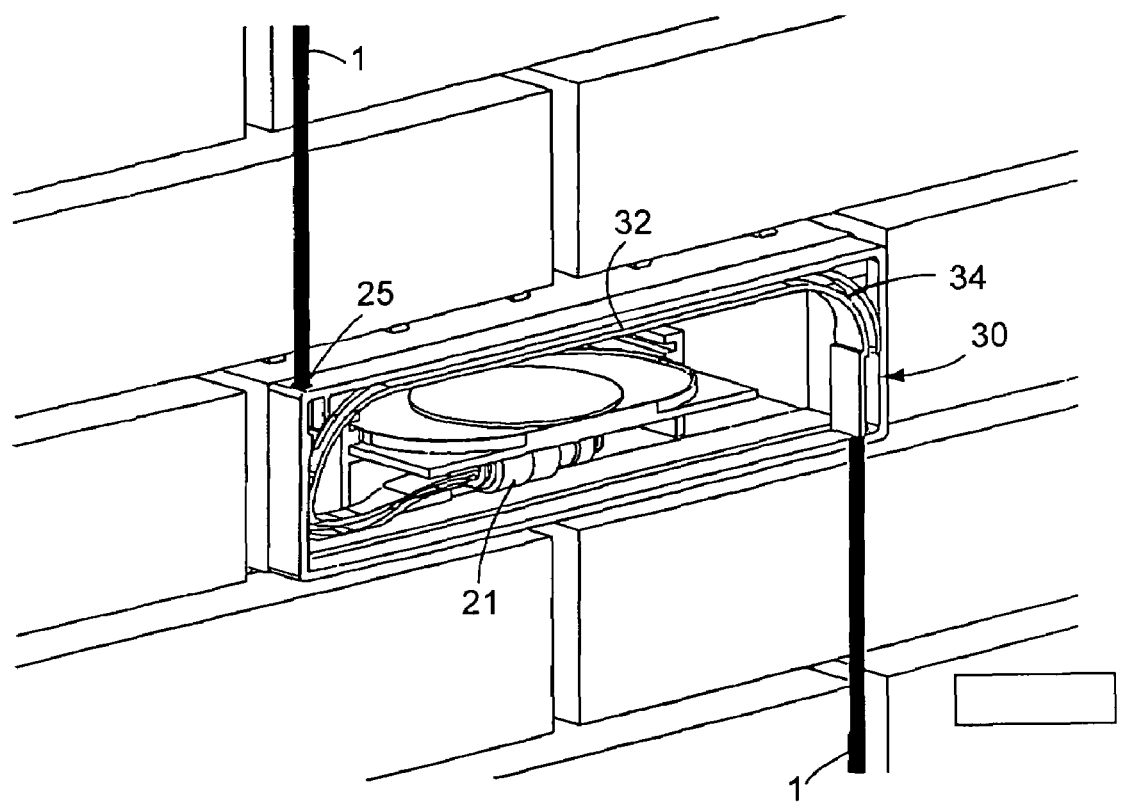
FIG. 6 shows the single-chambered device when installed, with overhead and underground tube/cable inputs.

FIG. 6 shows the device set up in a configuration receiving an overhead and underground feed on the exterior wall, as installed at a customer's premises. (The drawing shows both feed directions mainly for purposes of illustration, as typically only one direction of feed is used for any installation.) The front cover (40) has been removed to show the contents of the housing. Here, the housing (20) with the fibre management adapter (30) fitted thereto includes a fibre storage tray (23). In a fibre installation, the fibre management adapter provides guidance and control over the bend of optical fibres entering the device, to guard against the fibre being bent too tightly.

The figure shows features which in practice would be obscured by the presence of mortar between the courses of bricks. The external cable (1) leads over the outer face (WF1) of the wall and enters the device through a knockout hole (25). It is then guided along the paths (32, 34) of the fibre management adapter (20), the excess fibre stored on the fibre storage tray (23) (shown here in a closed position) before it is fed into the gas block connector (21).

Figure 7A:
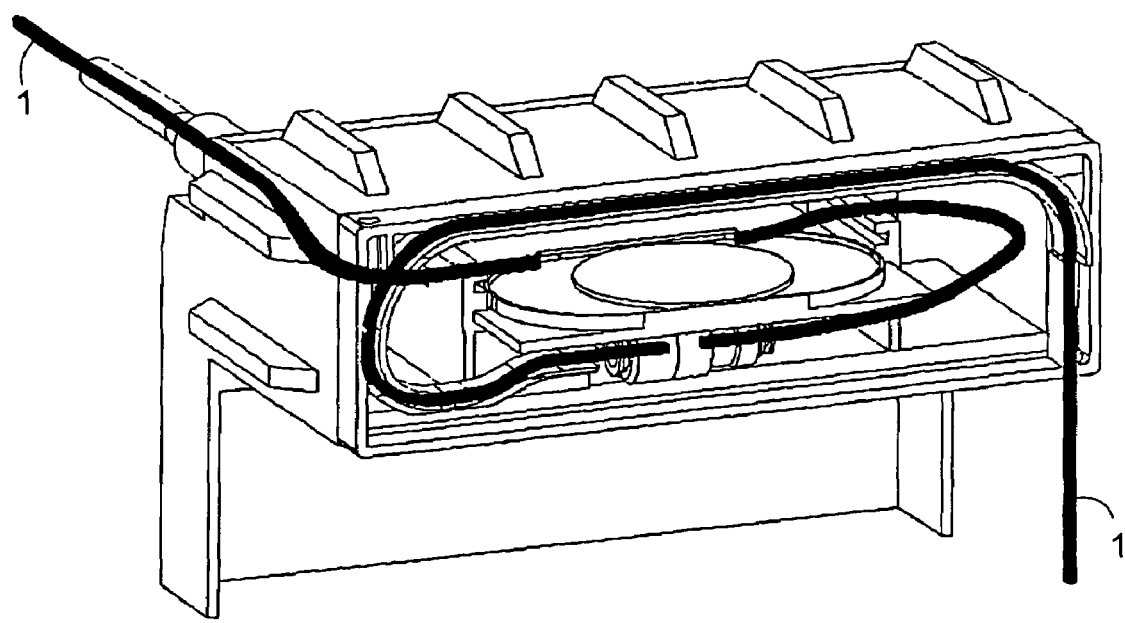
FIG. 7A is a view of the single-chambered device showing cable/tube routing within the housing in an underground feed configuration.
Figure 7B:
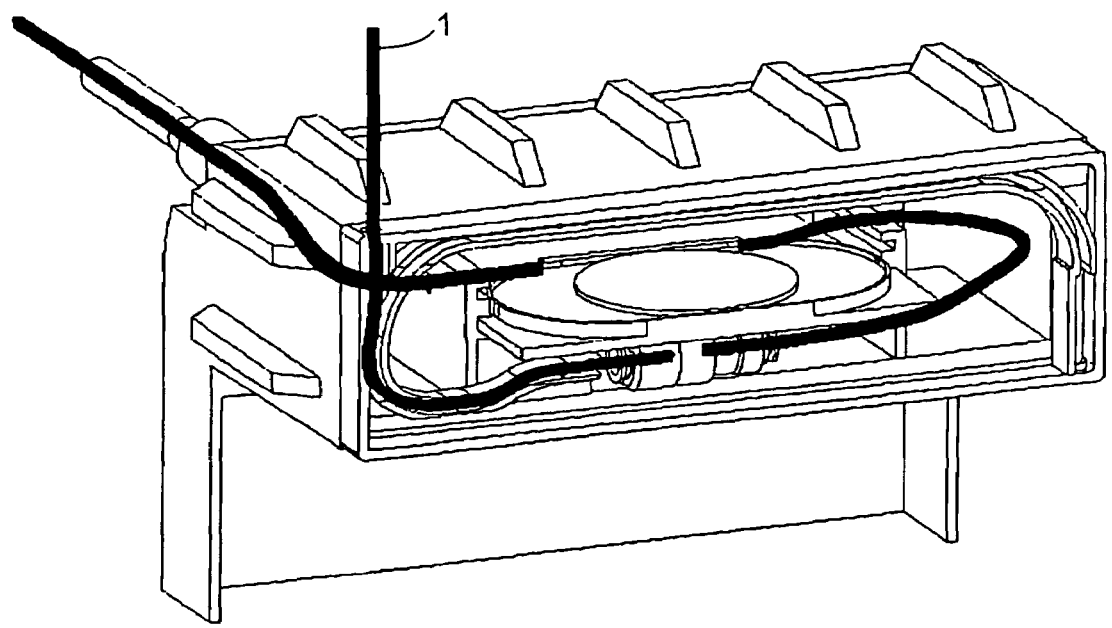
FIG. 7B is a view of the single-chambered device showing cable/tube routing within the housing in an overhead feed configuration.

FIGS. 7A and 7B show the route taken by optical tube or fibre within a device configured as shown in FIG. 6. Both figures show a blown fibre tube installation with tube terminated on one side of the splice tray and tube terminated on the other side of the splice tray. The tube could lead to an NTE located within the device. The external cable is routed to the splice tray where it is spliced to the fibre from the inside of the premises, which may be connected to the NTE. Alternatively the external fibre may be spliced to a fibre tail leading from an NTE module located within the device of the invention.

FIG. 7A shows an underground feed over the wall surface, while FIG. 7B depicts a wall-surface overhead feed.

Figure 8:
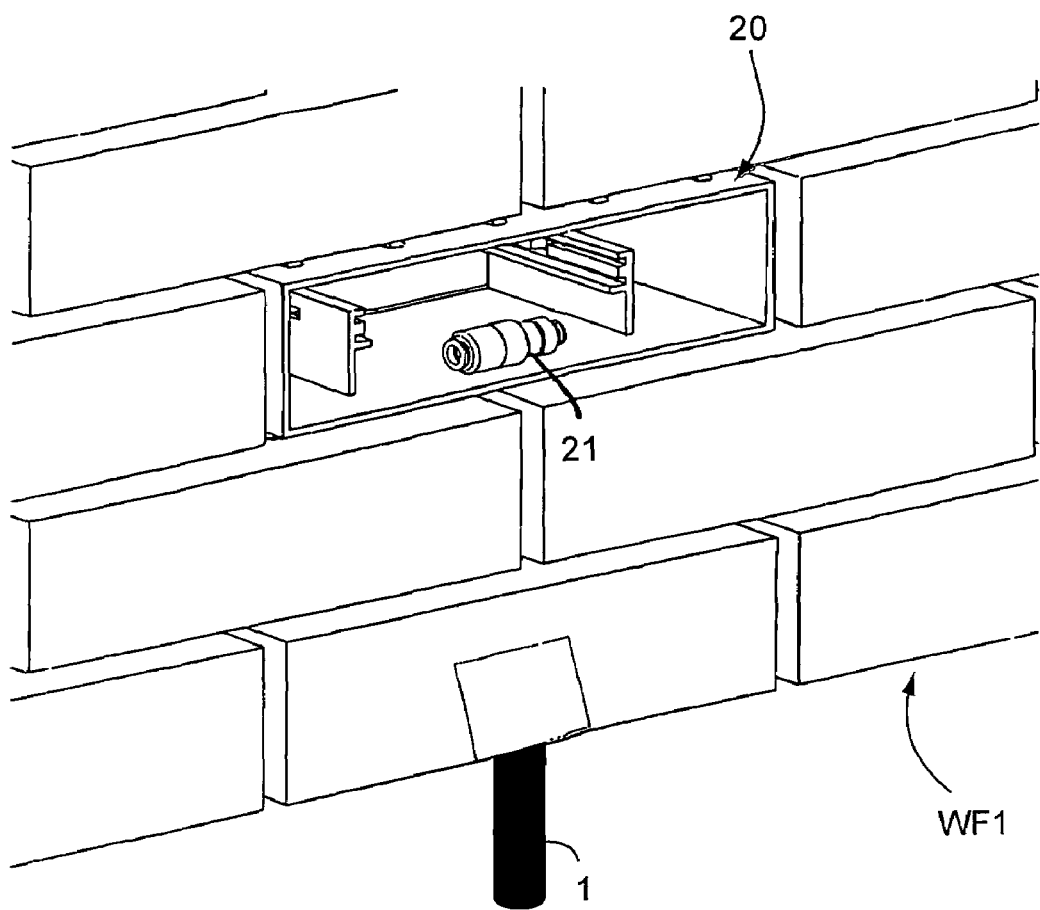
FIG. 8 shows the single-chambered device when installed, with a cavity duct feed.

FIG. 8 shows the device without its front cover, installed with a cavity duct feed arrangement, with a gas block connector (21). The external cable (1) is here shown to lead from an underground feed, to be fed into the gas block connector. The fibre management adapter (30) is absent from this configuration because it manages only incoming fibre arriving on the exterior wall surface.

Figure 9:
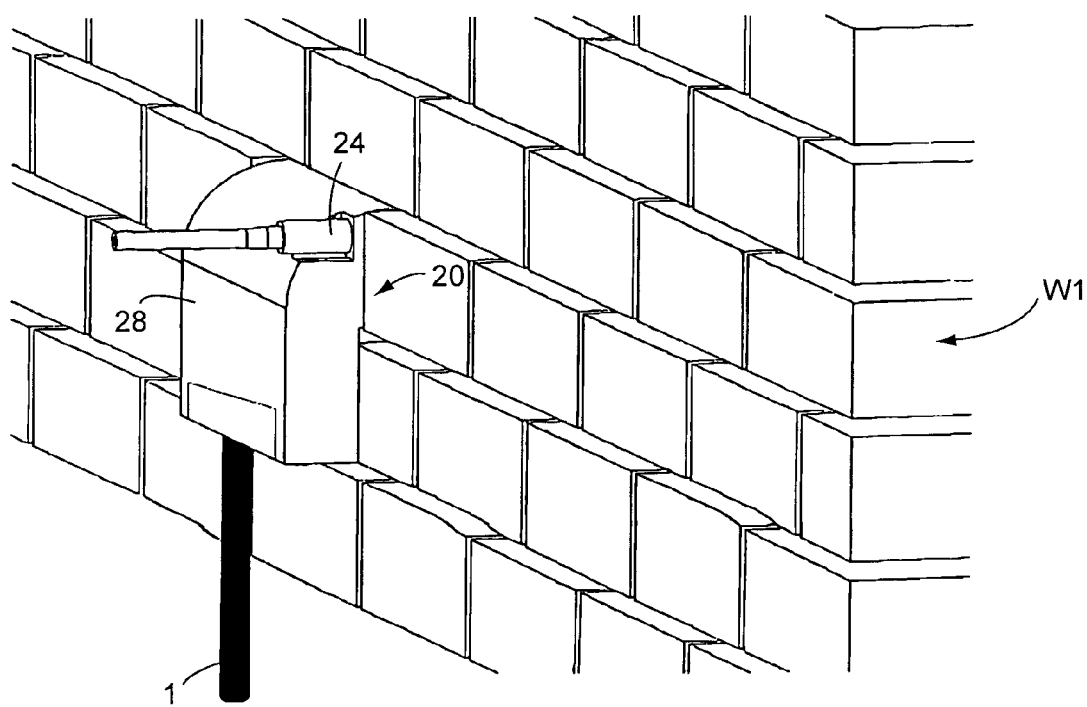
FIG. 9 shows a view of the installed single-chambered device, from within the wall cavity.

FIG. 9 depicts the exterior wall (W1) from within the cavity separating W1 and W2 in a cavity wall installation, showing the back view of an embodiment of the invention. The back plate (28) of the housing (20) as installed into the exterior wall (W1) is visible from this view, where the external cable (1) enters the housing from an underground feed within the wall cavity. This view also shows how the back plate helps to support and hold the device in place after installation. The internal cable duct (24) points away from the exterior wall towards the interior wall (W2, not depicted), so that the internal cable leads into the customer's premises through the interior wall, providing the means for telecommunications connection.

Figure 10A:
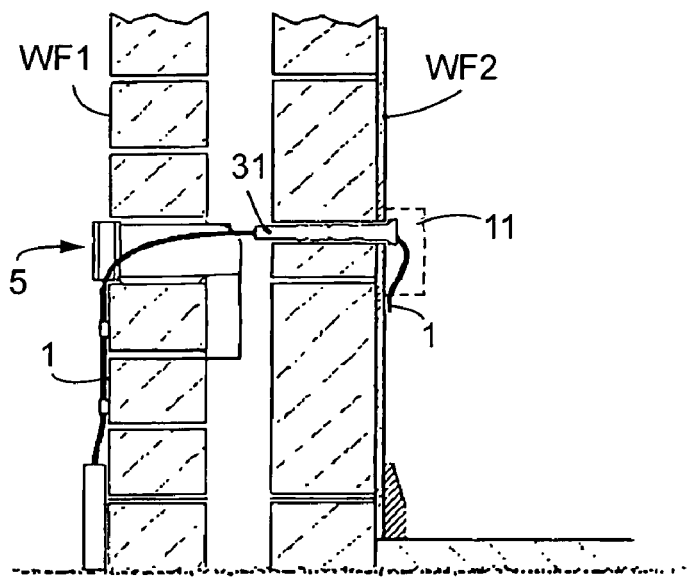
FIG. 10 is a view of a cross section of the walls of a customer's premises, depicting the method of providing telecommunications connections using the single-chambered device of the present invention in an underground feed configuration.
Figure 10B:
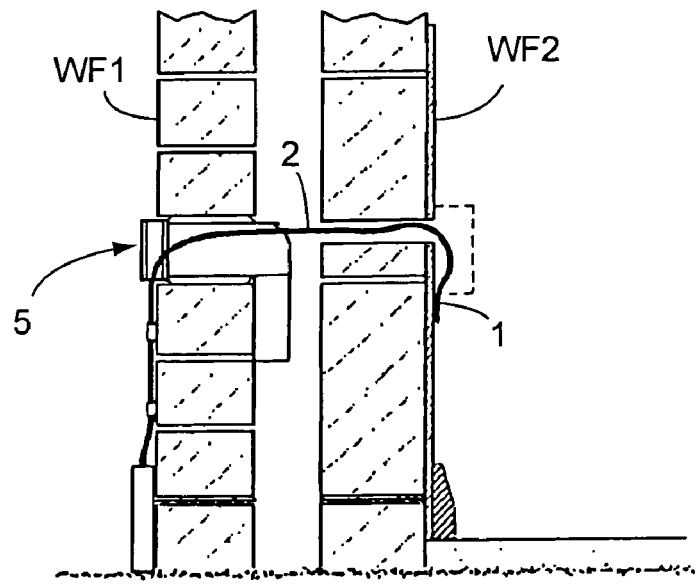

FIGS. 10A and 10B show cross sections of the exterior and interior walls of a customer's premises including the device of the invention (5) in a cavity wall installation. In both FIGS. 10A and 10B, the device is shown as being fed from an underground cable duct. The external cable (1) arrives to the foot of the exterior wall surface, and is routed upwards to and into the device.

After bend management (if the cable comprises tube/fibre) and termination (where this does not take place in or on the internal wall W2) within the device, the cable is routed through the cavity from the exterior wall to and in FIG. 10A it is further routed through a bend management device (31) that, where applicable, controls the bend radius of the optical fibre cable. The bend management device in this figure is depicted in the form of a type of hollow plug positioned within the body of the wall. Use of the device will help reduce in the extent of protrusion on the inward face (WF2) of the cable entering the premises. It would be clear that alternative bend control means can be used in lieu of the plug embodiment shown in FIG. 10A. For example, bend control of optical fibre bend can be applied on the surface of the inward wall—the internal component (11) can include apparatus for this purpose. Alternatively in a copper installation, the component (11) could comprise a copper wire outlet.

Bend control on the inward wall is a desirable but not necessary feature of the invention. The cable could simply travel through access bore (2) to emerge in the interior of the premises. FIG. 10B therefore depicts an installation without any bend control apparatus within the interior wall.

This depiction of an arrangement with an underground feed is similar to that for an overhead feed, save that in the latter case the cable (1) arrives at the surface of the exterior wall at a level above the device.

As noted above in connection with FIG. 3, the device of the invention allows the inclusion of a significant amount of apparatus within the set-up without the accompanying problems associated with increased amounts of plant which is seen by users. With the use of the device, telecommunications clutter within the interior of the customer premises can be considerably reduced.

Figure 11A:
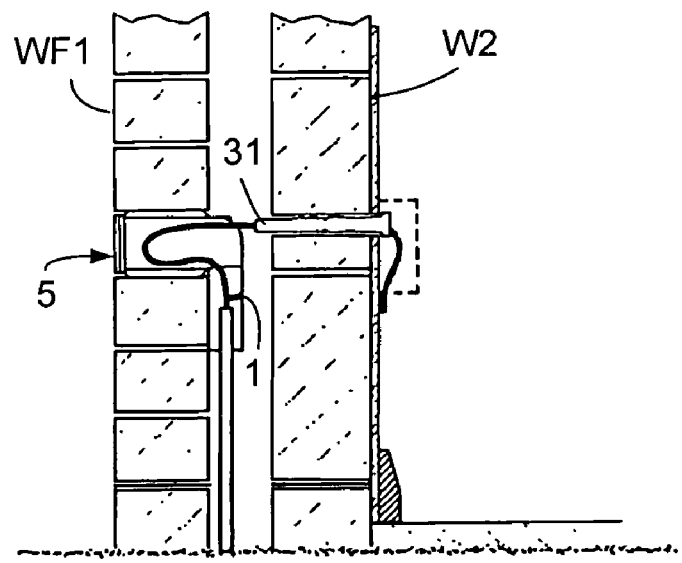
FIG. 11 is a view of a cross section of the walls of a customer's premises, depicting the method of providing telecommunications connections using the single-chambered device of the present invention in an underground cavity feed configuration.

FIGS. 11A and 11A are cross section of the exterior and interior walls of a customer's premises similar to FIGS. 10A and 10B respectively, but in a cavity feed installation. The external cable (1) is fed from an underground duct within the wall cavity, into the rear of the device (5) installed in the exterior wall (W1), where it is terminated. The internal cable is then routed through the interior wall (W2) to provide the premises with the telecommunications connection.

Figure 11B:
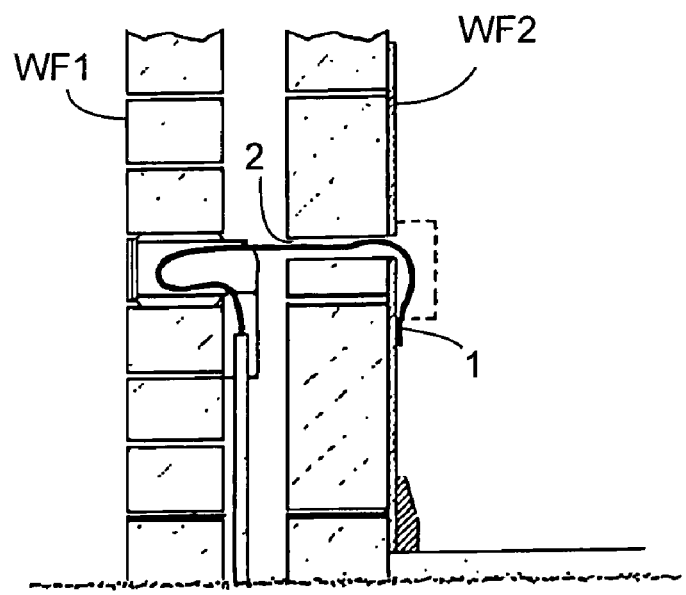

Similar to FIG. 10A, a bend control device (31) in the form of a plug positioned within the wall fabric is seen to be employed in FIG. 11A. FIG. 11B shows a similar installation without any bend control apparatus within the wall so that the cable simply travels through the access hole (2). However simple bend control could be effected at the surface of the inward wall (WF2).

The termination of the external network takes place within the device of the invention sited within the exterior wall: this realises the full benefit of the space-saving aspect of the invention, as use of the device in this manner would mean that all that is required on the inward face (WF2) is an interface for the customer's telecommunications equipment, e.g. a socket for a connector such as an RJ11 plug. Thus, unsightly and vulnerable clutter that would otherwise have to be accommodated on the inside of the premises is removed by the use of the device.

Second Embodiment: Double Chambered

The first embodiment of the invention above described a single-chambered housing (20) sitting in the external wall (W1). In a preferred embodiment of the invention, the device comprises two sections or chambers extending the full width of the walls. This version of the device is primarily intended for wall installations of relatively greater width, such as cavity walls, and is especially advantageous in allowing the customer easy access to the termination point.

Figure 12:
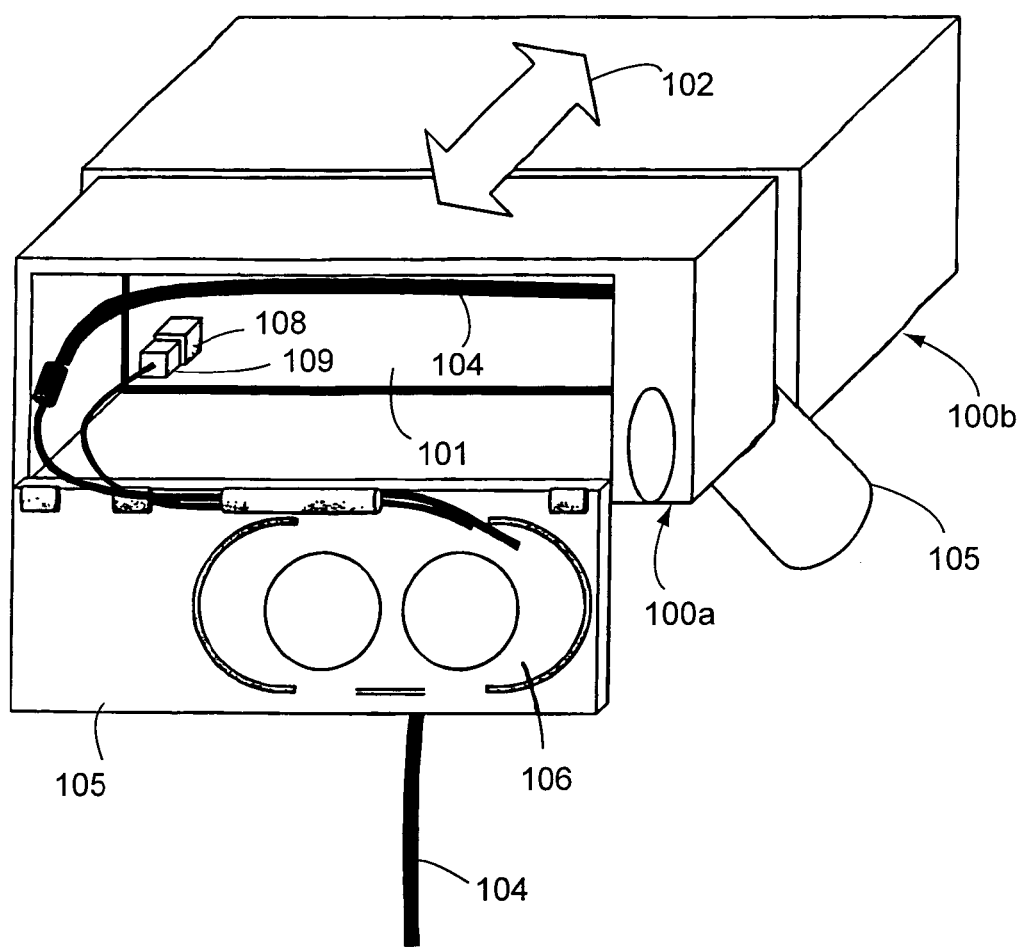
FIG. 12 shows a second embodiment of the invention being a double-chambered device.

FIG. 12 depicts the double-chambered device from the "external" view, which the service provider might have when the device is installed in the customer's wall. It comprises a housing with a first chamber (100a) and a second chamber (100b). The first, or external, chamber (100a) faces the exterior of the premises, and is intended to be accessible to, and the responsibility of, the service provider. The second, or customer's, chamber (100b) is intended to be accessible to the customer. In this embodiment, the chambers are separated by a dividing bulkhead (101).

In this embodiment, the two chambers telescope to and from each other, as indicated by the arrow (102), but the skilled person would understand that this is just one way for the chambers to co-operate with each other. Equally, it would be appreciated that depending on the topology of the wall, any number of variations are possible concerning the shape and connection of the housing and the chamber.

During installation, the chambers are pulled away from each other so that when installed, access to the chambers can be had at the wall surfaces facing the interior and exterior of the premises. Preferably, the chambers are installed during construction of the premises.

The external access network cable (104) is shown entering the housing in an external wall surface entry feed, although of course other modes of cable feeds are possible. For example, a cavity duct (105) can receive a cable entering through the cavity between the walls. The external chamber (100a) includes a fibre termination or splice tray (106), and an optical interface or connector (108). The splice tray is here shown to be built into the hinged door (105) to the chamber, although it could also take the form shown above in connection with the single-chambered device. The entering external cable (104) is spliced at the splice tray. From there, a further fibre unit (110), connectorised with an optical terminator (109) plugged into the optical connector. This connects the premises to the external network in the sense that even though the customer has yet to connect his own cable to the ONT, the premises is ready to accept the customer's cable and thus to connect the his equipment (such as his modems and the like) to the external network.

The optical connector of the fibre of the external network is typically a double socket accepting optical terminators (109), carrying fibre from the access network on the one side, and from customer equipment on the other side. The customer's cable, if comprising an optical fibre, can be filter with a similar terminator. In the drawing, the optical connector is shown positioned on the dividing bulkhead (101) so that each socket faces the exterior and interior of the premises.

Alternatively to the above, the entering fibre unit of the external network need not be initially spliced at the splice tray, but be directly connected to the optical connector, either by splicing or with an optical terminator.

In the set up shown in FIG. 12, the optical connector serves as the ONT demarcating the limit of responsibility of the service provider: beyond this is the customer's space. The optical connector or such other unit thus clearly defines the parties' boundaries. The presence of the dividing bulkhead (101) emphasises this by additionally shielding each chamber from the access of the other part. The bulkhead is however not essential to the invention. Also, the demarcation point need not have any particular location within the housing, although advantageously the optical connector is shown in this figure to be located on the dividing bulkhead.

When the terminated optical fibre is connected to the optical connector, the premises are deemed to be connected to the external network. A multiple access point (111) can be provided in the customer's chamber, serving as the premises' multimedia and network access point, allowing the customer to connect cables (113) such as those for data (e.g. Ethernet), video coaxial, telephony, and other networked equipment such as wireless LAN and DECT telephones. Power supply cables for the ONT could also be included here. The skilled person would appreciate that various other types of equipment could be included—such as a basic backup power supply allowing emergency communications (e.g. allowing 911 calls to be made even when power is down), solar panels in place of an electrical power supply, an optical trickier charger to meet the ONT's power needs, and so on.

Preferably, the multiple access point should be standardised and made so that inexpert customers can make connections themselves—for example, by simply push-fitting or snap-fitting plugs into sockets. This is a preferred embodiment as the equipment would be neatly and safely kept away from view and damage, eliminating clutter in the premises in the form of boxes or loose cables and connections.

However the scope of the invention would include, in an alternative scenario shown in the drawing, a module (112) comprising a casing with a face plate including sockets ready to accept e.g. push-fit plugs. One end of the case could plug into the optical connector (108) and the multiple access point (111) within the customer's chamber. This could "bring out" to the wall surface the ONT connection points out to (WF2). The face plate would include the multiple access point (111a). This would allow the customer to have easy access to the ONT equipment and allow surface connection to his computer, etc.

Figure 13:
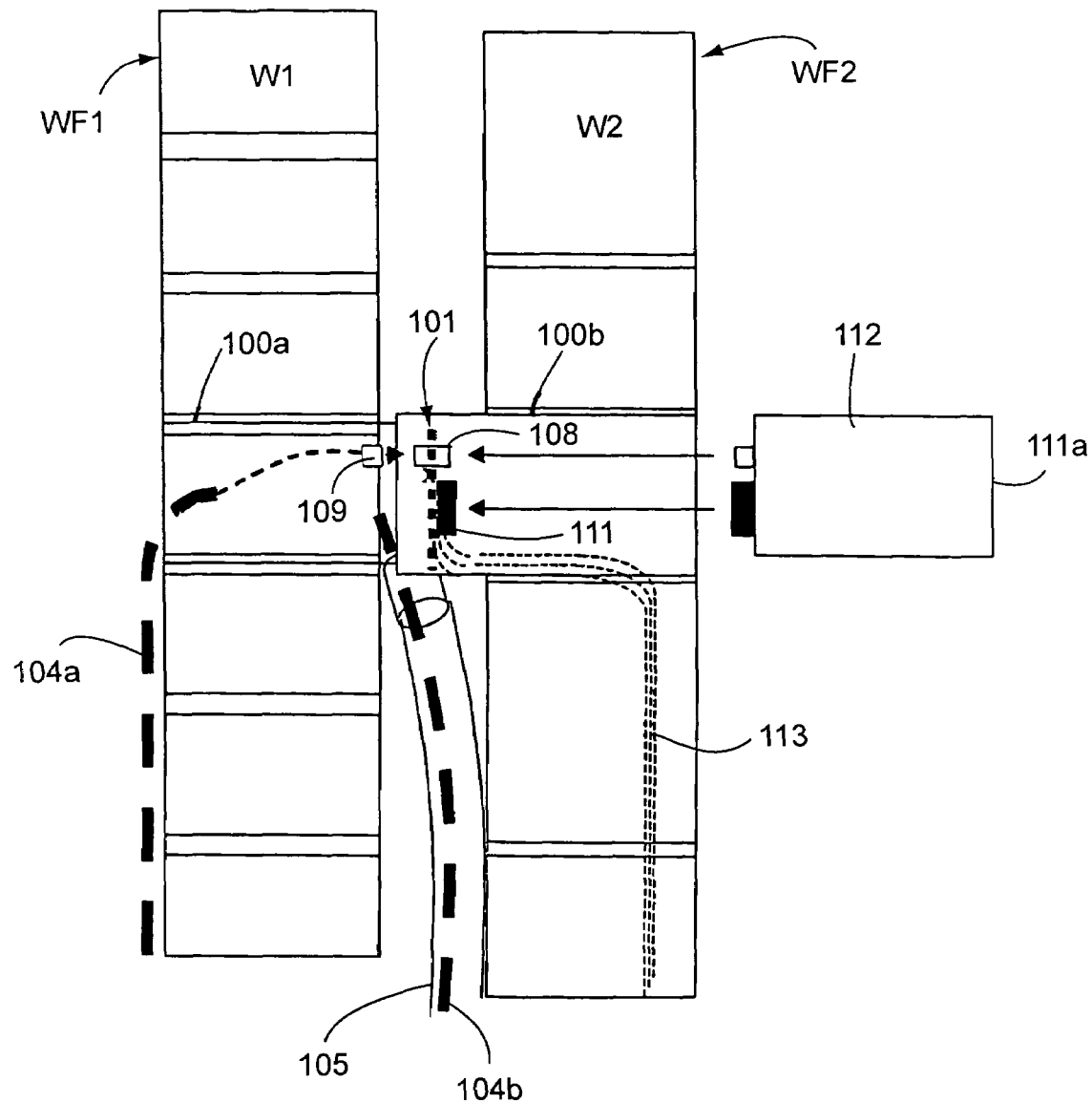
FIG. 13 shows the double-chambered device of FIG. 12 and its components when used in a cavity wall.

FIG. 13 is a schematic view of a cross section through a cavity wall comprising two wall skins (W1 and W2), including an installed double-chambered device according to the invention.

A typical installation process, using the blown fibre technique, could include the following steps:

Pulling in the blown fibre tube from the nearest network jointing closure or tube manifold point into/up to the customer termination "box"

Blowing fibre in the above

Initial splicing and fibre management of the short connectorised tail (customer/ONT connection) to the blown fibre from the network.

Commissioning test of the above to prove integrity of the optical path from the exchange or other equipment termination.

Visit by a service provider engineer to make "copper" connections to ONT equipment (power/alarms, Ethernet, voice pairs and possibly video coaxial cable) and manage customer's premises equipment configuration Possibly: revisit by a service provider engineer to diagnose failed installations/commissioning tests Possibly: revisit by service provider engineer if repair/replacement is outcome of above As for the single-chambered version, WF1 is the wall facing the exterior of the premises, while WF2 faces the interior of the premises. External chamber (100a) communicates with the customer's chamber (100b). The external cable (104) can arrive from the access network either across the wall surface (104a) or by a cavity feed (104b) via a cavity duct (105). The fibre unit (110) from the entering cable, being fitted with an optical terminator (109) is plugged into the optical connector (108), the connector sitting on the dividing bulkhead (101), with its sockets facing both directions.

This view of the device shows how the housing spans the whole width of the cavity walls, thus allowing the service provider and the customer access to the optical connector representing the ONT and the boundary of responsibility. As noted above, this boundary need not be located in any particular part of the housing within the wall space, although for practical reasons, locating it at or near the center point of the wall width would allow each party about the same level of ease of access. It can be seen from this view also that the ONT can be accessed by the service provider from an access point from the exterior of the premises on (WF1) without need to obtain access to the interior premises. At the same time the customer too has ready access to the ONT, by reaching into the customer's chamber from the interior of the premises at an access point located on (WF2).

The above apparatus and method describes certain specific implementations of the inventive concept, which is not restricted to the termination and connection of telecommunications cables, but which can extend to any situation requiring cable entry into premises. In the most preferred embodiment there is no need to need to modify building fabric to install the device, and after the need for the service ends, the device need not be removed, but can be left within the fabric of the wall if it is so wished.

A significant advantage of using the apparatus and installation method according to the invention, is that the external network service provider can now have access to the termination point without having to schedule visits to the interior of the customer's premises. As briefly noted above, scheduling difficulties are a real problem quantifiable in monetary terms by looking at lost time, manpower and goodwill. Adoption of the invention thus helps to solve the problems associated with the initial cabling of the customer premises to the external network. Furthermore, real advantages can also be gained in connection with the ability of the external network service provider have access to the NTE or ONT at any time e.g. to test the connection.

Another important advantage of the invention over current apparatus and methods, is that it goes some way to future-proofing the installation. The capacity of the device allows it to accommodate relatively more and a larger variety of telecommunications plant, so that once the housing is installed, suitable components can be included within the housing (20). Its position on the exterior wall allows personnel from the external network service provider to maintain and test the NTE, and also to e.g. remove and/or add components to upgrade premises currently having a copper telephone connection, to bring optical fibre directly into the home. The description above refers throughout to this example of upgrading the premises from copper to fibre; equally copper could be upgraded to coaxial or other cables, or in a less likely scenario, to downgrade an optical or coaxial connection to a copper one.

The invention is described herein mainly in the context of an installation with cavity walls for convenience. Clearly, the invention could also be used in solid wall constructions (that is, those without cavities). Nowadays, at least in non-tropical climates, such walls are normally relatively thick, and if made of bricks will be at least two brick-widths thick. Consequently in such situations the single-chambered housing would be used in place of a brick in the outer layer of the wall—an appropriate aperture being provided in the inner layer to permit access from the housing to the interior of the building. Equally, the double-chambered version of the invention could be used to extend the full width of the wall installation, should the single-chambered device extend insufficiently for this purpose.

The scope of the invention is not limited to premises with wall installations of considerable width in cross section. A housing could well be installed in walls comprising a single brick's width (in the UK, generally about 102.5 mm), although the amount of available space within the housing would restrict the amount of equipment that can included. The skilled person would however recognise that, along the lines of the discussion above in connection with FIG. 3, the housing could be dimensioned to be slim in width but relatively tall (when installed), with the equipment therein rearranged accordingly, e.g. the splice tray could be vertically aligned when installed.

In certain circumstances, the invention might require suitable modification to take into account environmental factors (e.g. insulation against sound, temperature and moisture), be adapted to bridge the inward and outward faces of a wall in a solid wall installation without a cavity. For timber constructions one could still use the same housings as designed for a brick-built structure, although external flanges with apertures for screws or nails could be provided to permit the "brick" to be fixed to the timber of the building.

The apparatus, methods and configurations described above and in the drawings are for ease of description only and not meant to restrict the invention to any particular embodiments. It will be apparent to the skilled person that various sequences and permutations on the apparatus and methods described are possible within the scope of this invention as disclosed; similarly the invention could be used in various similar scenarios and building types.

What is claimed is:

1. An installation for terminating a network cable of a public communication network at customer premises, the installation comprising:
    termination means for terminating the network cable at a point where a network access provider's responsibility ends, and
    connection means allowing a connection to be made between the public communication network and the customer premises via the termination means,
    the termination means being enclosed within an external wall of the customer premises, the apparatus further including:
    a first openable and closeable access aperture to permit access to the termination means from outside the customer premises, and
    a second openable and closeable access aperture to permit access to the termination means from within the customer premises.

2. An installation according to claim 1 wherein the external wall is a cavity wall, the apparatus including a housing which bridges the cavity of the wall.

3. An installation according to claim 2, wherein the housing includes adjustable means to permit the housing to bridge the cavity of the wall.

4. An installation according to claim 3, wherein the adjustable means comprises a telescoping arrangement to permit the housing to bridge the cavity of the wall.

5. An installation according to claim 1 wherein the external wall is constructed from brick, and wherein the housing has an end portion dimensioned so that it will fit into the face of the wall in place of a brick of the type from which the face of the wall is constructed.

6. An installation according to claim 1 wherein the network cable comprises optical fibre.

7. An installation according to claim 6 wherein the termination means comprises an optical fibre splice.

8. An installation according to claim 7 wherein the housing further includes optical fibre management apparatus for controlling the bend of the optical fibre.

9. An installation according to claim 8 wherein the housing further includes electronic communications apparatus to support any one or more of data-based, or video-based, or telephony-based, applications.

10. An installation according to claim 1 wherein the housing further includes a solar power supply.

* * * * *